US012765506B2

(12) United States Patent
Leiker et al.

(10) Patent No.: US 12,765,506 B2
(45) Date of Patent: Oct. 20, 2026

(54) RAISED, RECESSED CAT LITTER BOX AND STORAGE SYSTEM

(71) Applicant: TRIMOXIE LLC, Lenexa, KS (US)

(72) Inventors: Amy Leiker, Lenexa, KS (US); Jody J. Allen, Valley Falls, KS (US)

(73) Assignee: TRIMOXIE LLC, Lenexa, KS (US)

(*) Notice: Subject to any disclaimer, the term of this patent is extended or adjusted under 35 U.S.C. 154(b) by 21 days.

(21) Appl. No.: 17/876,681

(22) Filed: Jul. 29, 2022

(65) Prior Publication Data

US 2022/0361439 A1 Nov. 17, 2022

Related U.S. Application Data

(63) Continuation-in-part of application No. 17/687,599, filed on Mar. 4, 2022, now abandoned.

(60) Provisional application No. 63/156,875, filed on Mar. 4, 2021.

(51) Int. Cl.
*A01K 1/01* (2006.01)
*A47B 81/00* (2006.01)

(52) U.S. Cl.
CPC ............ *A01K 1/0107* (2013.01); *A47B 81/00* (2013.01)

(58) Field of Classification Search
CPC ...... A01K 1/0107; A01K 31/06; A47B 81/00; A47D 5/00; A61G 7/00; A61G 7/05
USPC ........................................................ D30/161
See application file for complete search history.

(56) References Cited

U.S. PATENT DOCUMENTS 1,522,038 A * 1/1925 Stites ........................ A47D 5/00 4/557
3,261,651 A * 7/1966 Prowse .................... A47D 5/00 D6/384
4,302,857 A * 12/1981 Kodet .................... A47K 3/024 5/2.1
5,320,065 A * 6/1994 Leopold ................. A01K 1/035 229/120.32
5,544,958 A * 8/1996 McAfee ............... A01K 1/0107 312/138.1
5,964,190 A * 10/1999 Willinger ............... A01K 1/033 119/500

(Continued)

FOREIGN PATENT DOCUMENTS

CN 205144986 U * 4/2016
CN 206964775 U * 2/2018

(Continued)

*Primary Examiner* — Magdalena Topolski
*Assistant Examiner* — Alanna K Peterson
(74) *Attorney, Agent, or Firm* — Hovey Williams LLP; Crissa A. Cook

(57) ABSTRACT

A raised, recessed cat litter storage system provides a one stop station for storing all things pertaining to cat litter usage with a raised/elevated open cat litter box above an enclosed storage area. The raised, recessed cat litter storage system is created from two solid side walls, a solid bottom, a rear wall with small cut out for cords, two front double doors swinging open from the center with each respective door being hinged to the nearest adjacent side wall, and a front wall with a slot for inserting a perch which can be secured to the bottom side of the recessed litter box area floor securing and retaining the perch. The perch has a T-shape which, with two defined sections. The cross bar or top of the T-shape protrudes from the front or outer face of the front wall and creates a perch for an animal or use.

19 Claims, 13 Drawing Sheets

(56) References Cited

U.S. PATENT DOCUMENTS 6,182,612 B1 * 2/2001 Ross, Sr. ................ A01K 1/033 312/285
7,337,748 B1 * 3/2008 Morris ................. A01K 15/025 119/485
11,871,724 B2 * 1/2024 Zhang .................... A01K 1/033
2008/0196675 A1 * 8/2008 Murrer ................. A01K 15/027 119/706
2010/0043138 A1 * 2/2010 King ........................ A47D 5/00 5/2.1
2010/0206238 A1 * 8/2010 Pettys ...................... A01K 1/01 119/169
2011/0132273 A1 * 6/2011 Greene .................. A01K 1/033 119/472
2012/0079986 A1 * 4/2012 Boyer .................... A01K 1/033 119/28.5
2013/0160381 A1 * 6/2013 Sommer .............. A01K 1/0107 52/173.1
2015/0076973 A1 * 3/2015 Pierson ................... A61F 13/84 312/71
2017/0105583 A1 * 4/2017 Taft ........................ A47K 3/024
2017/0318772 A1 * 11/2017 Amicarelli ........... A01K 1/0107
2017/0318775 A1 * 11/2017 Chomos ................. A01K 1/033
2019/0141945 A1 * 5/2019 Begin .................... F16M 11/38 119/165
2019/0387706 A1 * 12/2019 Bachman ................ E06C 1/393
2020/0267927 A1 * 8/2020 Duncan ................ A01K 1/0107
2020/0315128 A1 * 10/2020 Becherer .............. A01K 1/0107
2022/0046889 A1 * 2/2022 Oldencamp .......... A01K 1/0107
2023/0329448 A1 * 10/2023 Kubiak .................... A47D 5/00

FOREIGN PATENT DOCUMENTS

CN 210749623 U * 6/2020
DE 202012007058 U1 * 8/2012 ............... A47D 5/00
FR 2710507 A1 * 4/1995 ............... A47D 5/00
KR 20090074856 A * 7/2009 ............. A01K 1/033

* cited by examiner

RAISED, RECESSED CAT LITTER BOX AND STORAGE SYSTEM

TECHNICAL FIELD OF THE INVENTION

The present invention relates to a litter box. More specifically, the present invention relates to an elevated or raised open litter box and storage system.

BACKGROUND OF THE INVENTION

Many pet owners are older adults with common disabilities such as arthritis or osteoarthritis that often makes bending over and kneeling difficult, especially with advancing age. An older pet owner caring for pets, especially cats or other pets with a litter box need or requirement, the need for frequently bending and kneeling is increased.

Current enclosed or cabinet/furniture type cat litter systems or boxes are made for the litter box to be on the lower level and are enclosed making access difficult, whereas the real solution to eliminating bending over is for the litter box to be located in a raised or lifted position, preventing the cat owner from having to bend over and to provide open access to the litter box.

As a result of older cat owners and those with arthritic conditions facing increasing diminished ability to provide care for their pets, many solutions have been created to reduce this issue, such as complex, mechanical litter box lifting systems, and long handled litter scoops, each which have their disadvantages.

Lifting and automated systems are generally expensive to purchase and do not always result in eliminating the need to bend over to replace new or used litter.

Long handled scoops and other solutions are often difficult to operate and require a certain level of dexterity that is commonly diminishing in older adults who represent a large number of care providers for cats. The need for and lack of proper dexterity often results in spills or messes that then result in the user having to bend over or get on their knees to clean up, or additional work with a sweeper or broom, which also provides stress to the back and knees. Cat owners who cannot bend over or get on their knees are unable to thoroughly clean the litter box, leaving the owner and cat living with potential health hazards.

Therefore, what is needed is a solution for raising a litter box to a higher level, which still allows easy access to a cat, even a cat with heath or mobility issues, as well as providing an elevated location to reduce or eliminate the need for a care provider to bend over or lower to their knees to clean and replace litter.

Additionally, what is needed is not only a means for raising the litter box, but for also providing storage containment.

Finally, what is needed is a raised, recessed cat litter storage system which is: elevated so that the litter remains out of the reach of small children; elevated so that it is out of reach of other pets, such as dogs; elevated to eliminate cat owners from having to bend down and provides for storing or locating cat necessities all in one place, so that it is tidy, concealed and offers mobility for both cats and cat owners.

SUMMARY OF THE INVENTION

The present invention is a raised or elevated open cat litter box and storage system.

The raised, recessed cat litter storage system is created from two solid side walls, a solid bottom, a rear/back wall with small cut out for cords, two front double doors swinging open from the center with each respective door being hinged to the nearest adjacent side wall, and optionally having door handles.

An open area is created by the walls and a single internal shelf located approximately halfway up the back and side walls creating a recessed litter box area floor for the placement of a litter box.

A perch is located on a front wall providing access to the recessed litter box area and litter box. First and second top side rails and a rear top wall rail provide trim features for the raised, recessed cat litter storage system. The shelf is manufactured in a fixed location corresponding to the slot in an orientation allowing the T-shaped perch to be located in the slot and under but against and adjacent to the bottom of the recessed litter box area floor.

The perch is installed into position below the recessed litter box area floor through the slot and is secured to and retained by connection to the bottom of the recessed litter box area floor.

The perch has a T-shape which, with two defined sections. The cross bar or top of the T-shape protrudes from the front or outer face of the front wall 7 and creates a perch for an animal or use. The arm or bottom of the T-shape extends in to and through the front wall via the slot.

The arm or bottom of the T-shape extends through the slot and below the litter box floor. The arm or bottom of the T-shape is then secure to the litter box floor by one or more screws or attachment means.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

LIST OF REFERENCE CHARACTERS

Figure 1:
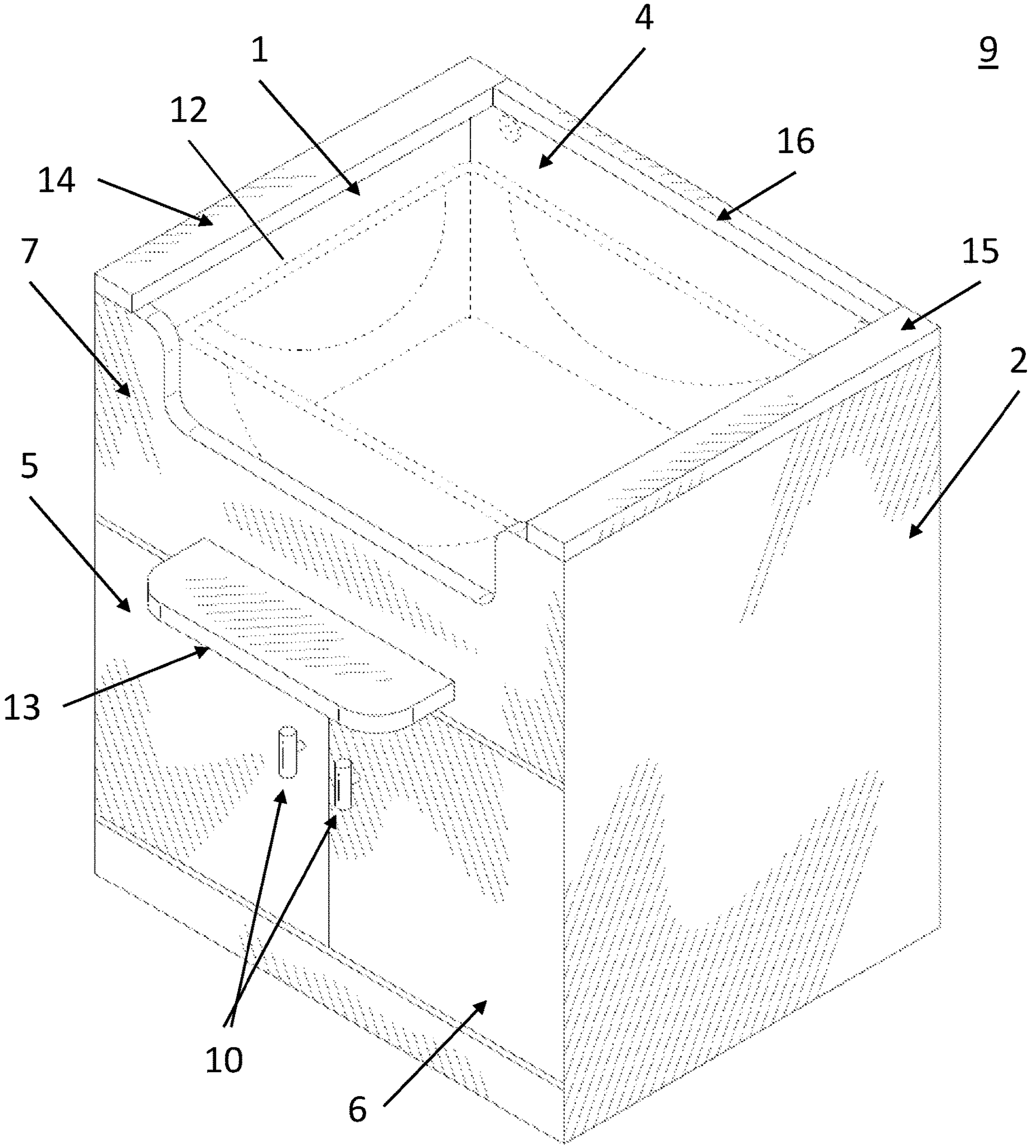
FIG. 1 is the perspective view of the raised litter box storage system of the present invention.

1. Side wall
2. Side wall
3. Solid bottom
4. Rear/back wall
5. Front Double Door
6. Front Double Door
7. Front Wall
8. Slot
9. A recessed, elevated/raised, recessed cat litter box storage system
10. Door Handles
11. Open top box location
12. Litter box
13. Front Perch
14. Top of Side Wall
15. Top of Side Wall
16. Top of Rear Wall
17. Recessed Litter Box Area Floor
18. Underside of the box floor
19. Wheels
20. Wheels
21. Wheels
22. Wheels

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized, and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, the device is understood that the invention may be practiced without these specific details. In other instances, well-known structures and techniques known to one of ordinary skill in the art have not been shown in detail in order not to obscure the invention.

The present invention is a raised, recessed cat litter storage system which allows easy access to a cat, even a cat with heath or mobility issues, as well as providing an elevated location to reduce or eliminate the need for a care provider to bend over or lower to their knees to clean and replace litter.

The present invention teaches a raised, recessed cat litter storage system 9 which is: elevated so that the litter remains out of the reach of small children; elevated so that it is out of reach of other pets, such as dogs; elevated to eliminate cat owners from having to bend down and provides for storing or locating cat necessities all in one place, so that it is tidy, concealed and offers mobility for both cats and cat owners.

The present invention is designed to raise standard sized litter boxes 12 up and off the floor by at least two (2) feet. Standard sized litter boxes 12 can be inserted in the platform or recess 11 taught by the present invention.

The present invention teaches making a one stop station for cat owners to be able to store and use all things pertaining to cat litter usage. The present invention teaches the use of a raised, recessed cat litter storage system 9 for easier maintenance/cleaning. Once the cat litter box storage system 9 is set up with an owner's preferred items, the cat litter box storage system 9 is easy to store items needed to maintain a tidy bathroom/loo for the cat to use and its owner to keep tidy.

Also, by teaching an embodiment of the present invention with wheels, the present invention can be used to move all items from room to room, all at one time. From delivery spot to desired area. It is a multi-tool, for cat owners.

The cat litter box storage system 9 of the present invention teaches a raised, recessed cat litter storage system 9. The raised, recessed cat litter storage system 9 is designed to be used in small living spaces as well as easy access for cats and owners, always allowing for more to be added, in various ways.

The raised, recessed cat litter storage system 9 of the present invention creates a maintenance area for cat owners to ensure the bathroom area is clean, and store various tools, all either concealed or open depending upon the owner's preferences.

Now referring to the FIG. 1, the raised, recessed cat litter storage system 9 is illustrated. The raised, recessed cat litter storage system 9 is created from two solid side walls 1 and 2, a solid bottom 3, a rear/back wall 4 with small cut out for cords, two front double doors 5 and 6 swinging open from the center with each respective door being hinged to the nearest adjacent side wall, and optionally having door handles 10. An open area 11 is created by the walls and a single internal shelf located approximately halfway up the back and side walls creating a recessed litter box area floor 17 for the placement of a litter box 12. A perch 13 is located on a front wall 7 providing access to the recessed litter box area 11 and litter box 12. First and second top side rails 14 and 15 and a rear top wall rail 16 provide trim features for the raised, recessed cat litter storage system 9. The shelf is manufactured in a fixed location corresponding to the slot in an orientation allowing the T-shaped perch to be located in the slot and under but against and adjacent to the bottom of the recessed litter box area floor 17.

Figure 2:
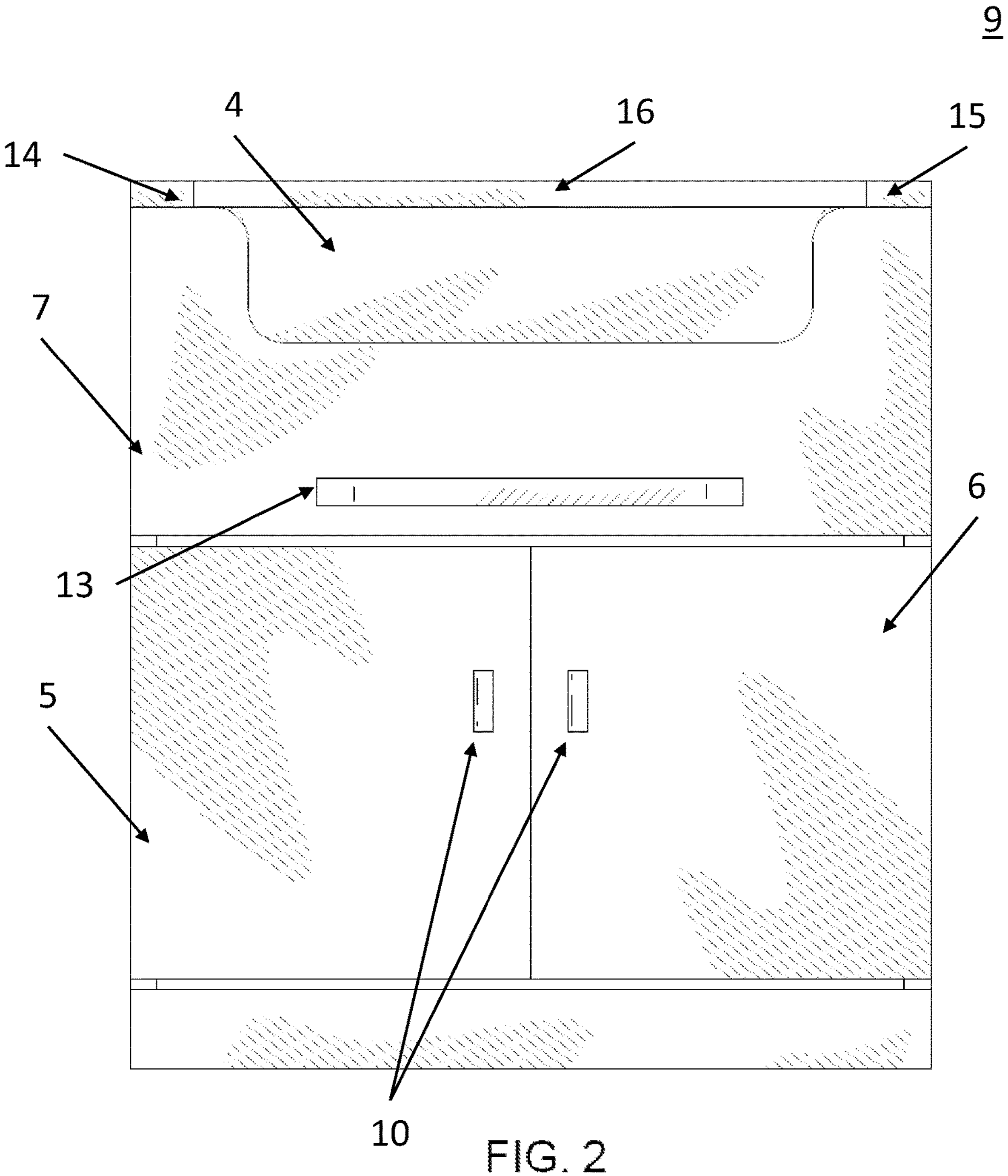
FIG. 2 is the front view of the raised litter box storage system of the present invention in a closed position.

FIG. 2 is the front view of the raised litter box storage system of the present invention in a closed position. The raised, recessed cat litter storage system 9 is created from two solid side walls 1 and 2, a solid bottom 3, a rear/back wall 4 with small cut out for cords, two front double doors 5 and 6 swinging open from the center with each respective door being hinged to the nearest adjacent side wall, and optionally having door handles 10. An open area 11 is created by the walls and a single internal shelf located approximately halfway up the back and side walls creating a recessed litter box area floor 17 for the placement of a litter box 12. A perch 13 is located on a front wall 7 providing access to the recessed litter box area 11 and litter box 12. First and second top side rails 14 and 15 and a rear top wall rail 16 provide trim features for the raised, recessed cat litter storage system 9. The shelf is manufactured in a fixed location corresponding to the slot in an orientation allowing the T-shaped perch to be located in the slot and under but against and adjacent to the bottom of the recessed litter box area floor 17.

Figure 3:
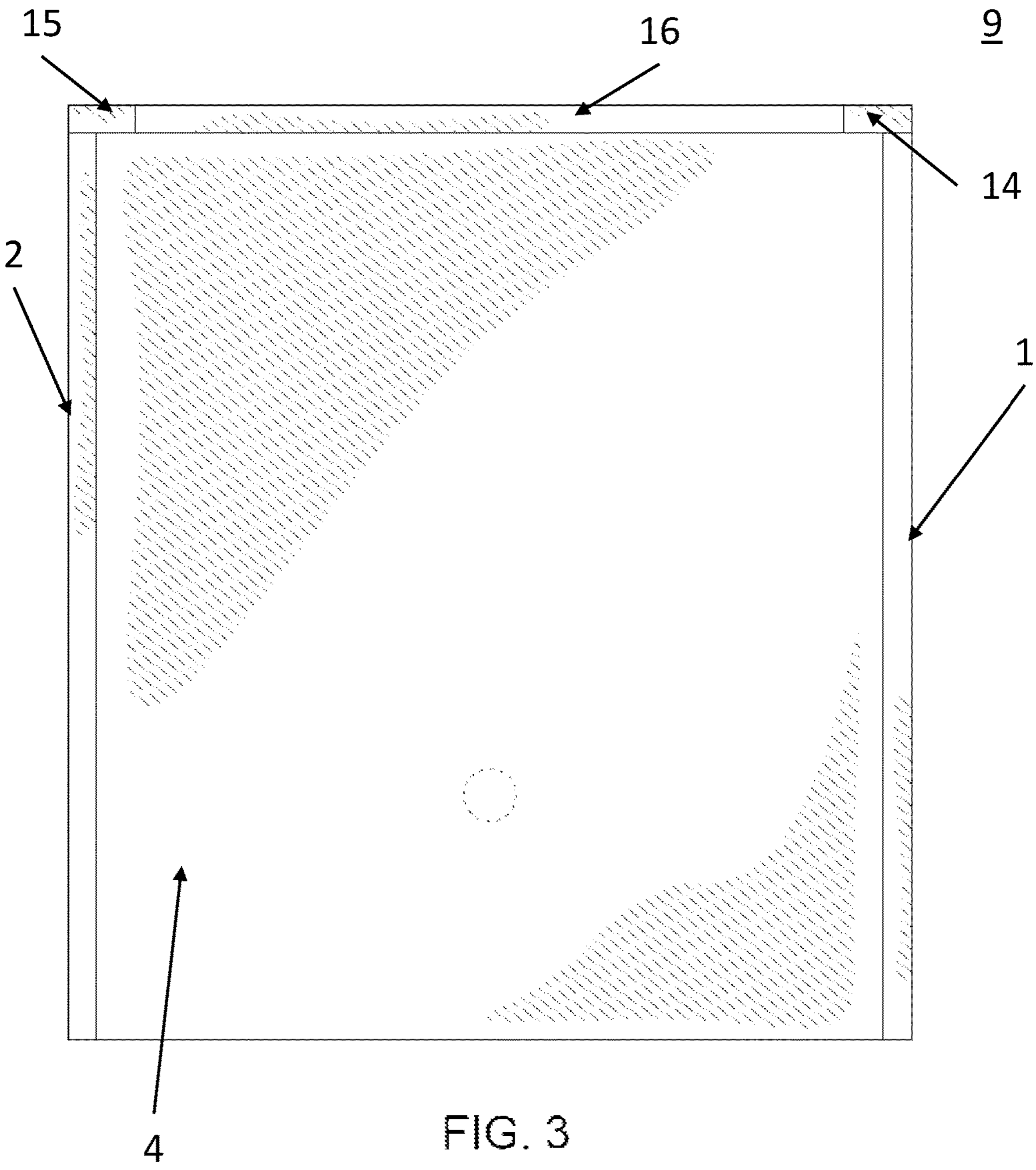
FIG. 3 is the rear view of the raised litter box storage system of the present invention.

FIG. 3 is the rear view of the raised litter box storage system 9 of the present invention. The rear wall 4 has a small cut out for cords and is secured to the side walls 1 and 2.

Figure 4:
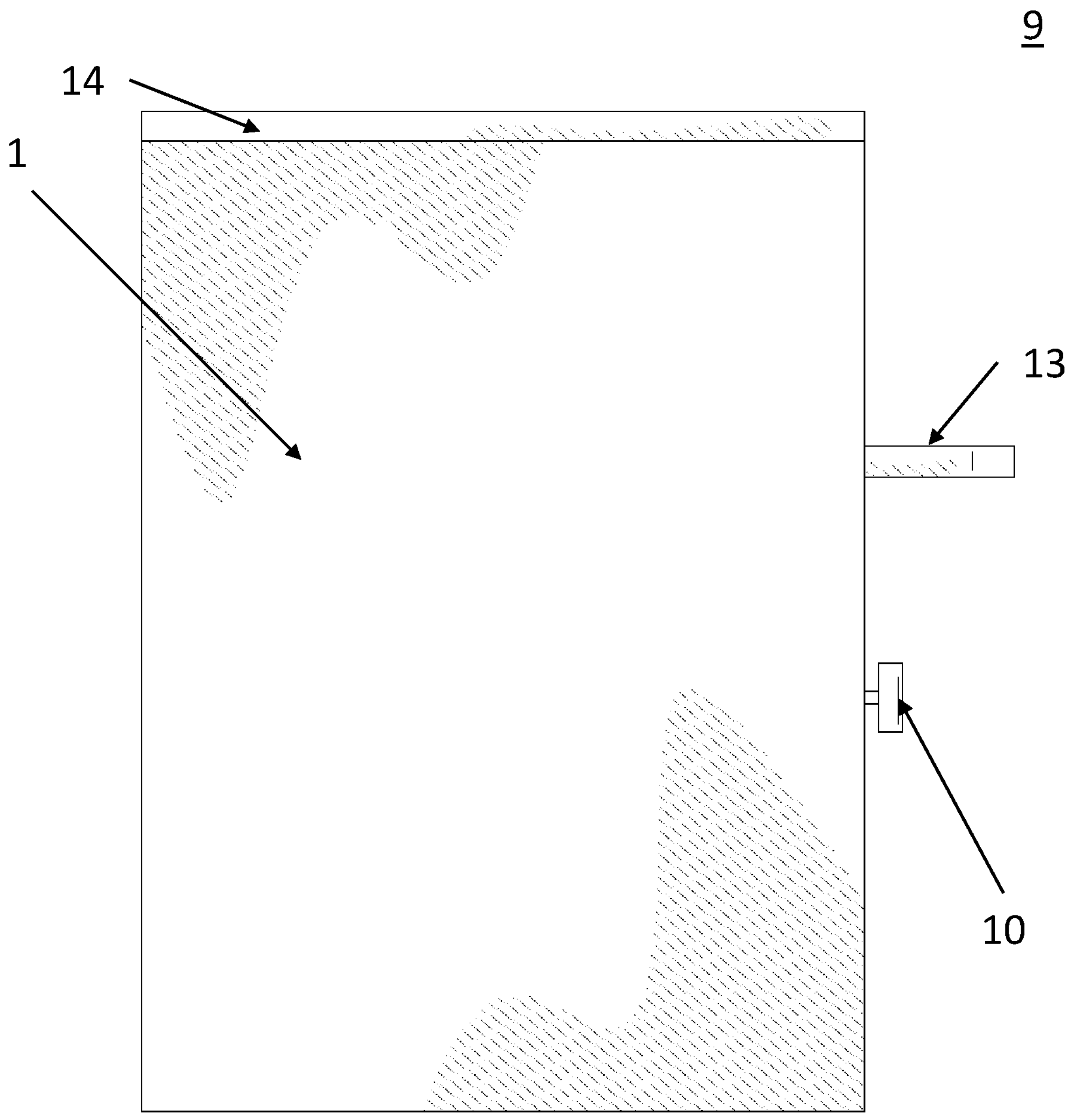
FIG. 4 is the right side view of the raised litter box storage system of the present invention.
Figure 5:
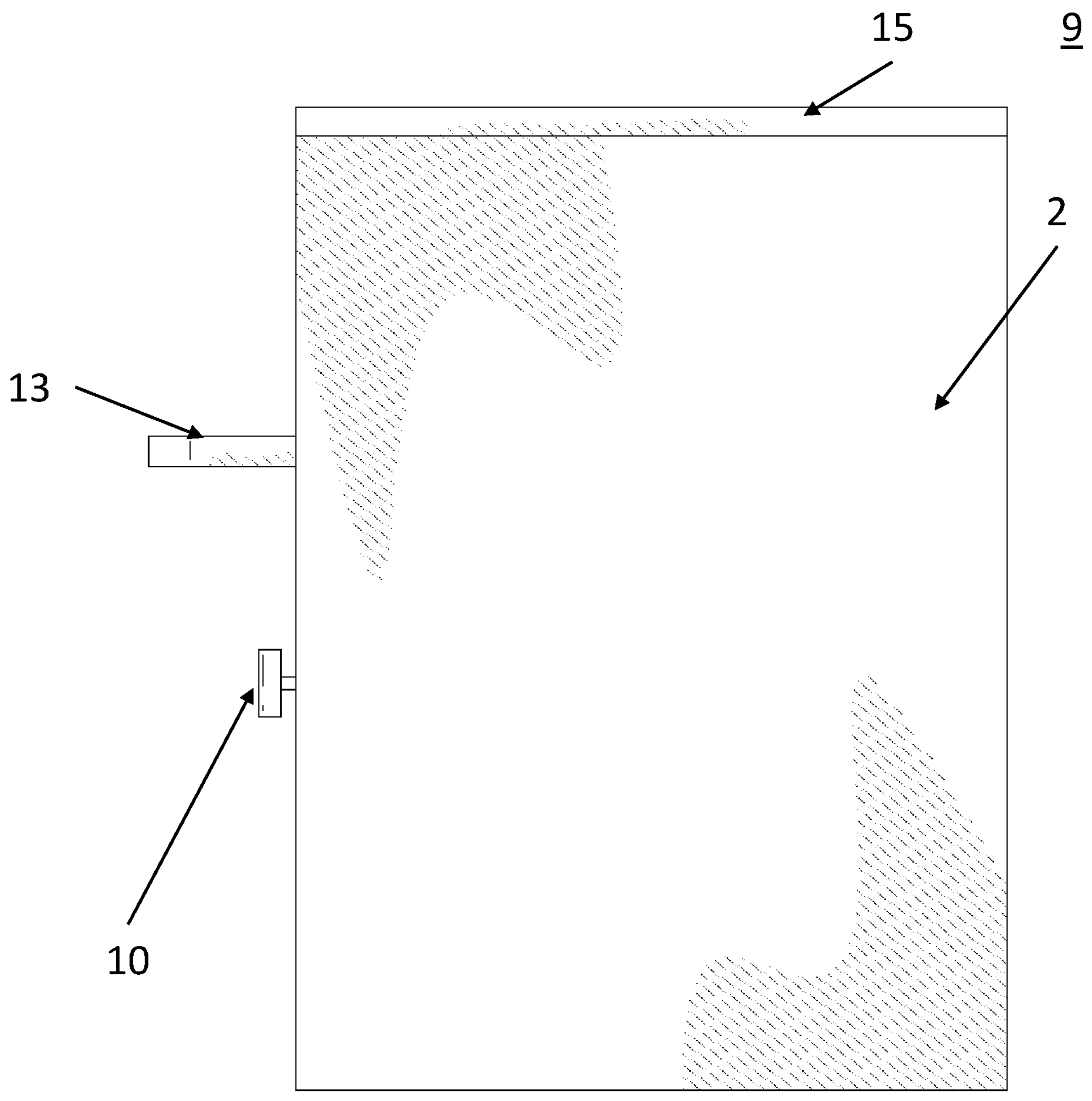
FIG. 5 is the left side view of the raised litter box storage system of the present invention.

FIG. 4 is the right side view of the raised litter box storage system 9 of the present invention. FIG. 5 is the left side view of the raised litter box storage system 9 of the present invention. In these views, the side walls 1 and 2 are capped with their respective top trim pieces 14 and 15. The front surface of the raised litter box storage system 9 is flat except for the protruding perch 13 and optionally protruding door handles 10.

Figure 6:
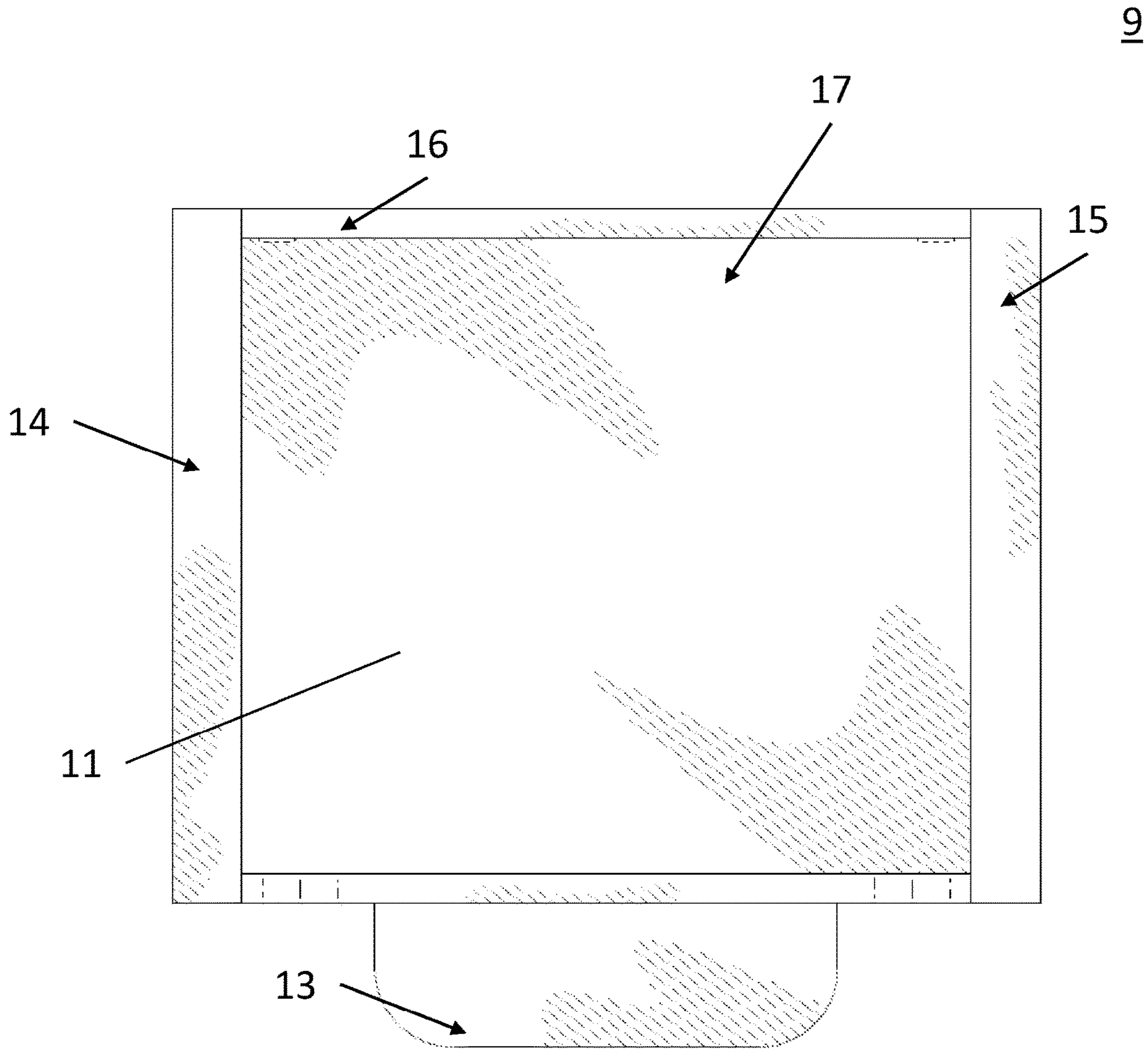
FIG. 6 is the top view of the raised litter box storage system of the present invention.

FIG. 6 is the top view of the raised litter box storage system 9 of the present invention. The side walls 1 and 2 are trimmed with their respective top trim pieces 14 and 15 and the back wall 4 is trimmed with its top trim piece 16. The walls 1, 2, and 4 and their respective top trim pieces 14, 15, and 16 secured to a litter box floor section 17 create an open top box location 11 for the insertion of a litter box 12.

Figure 7:
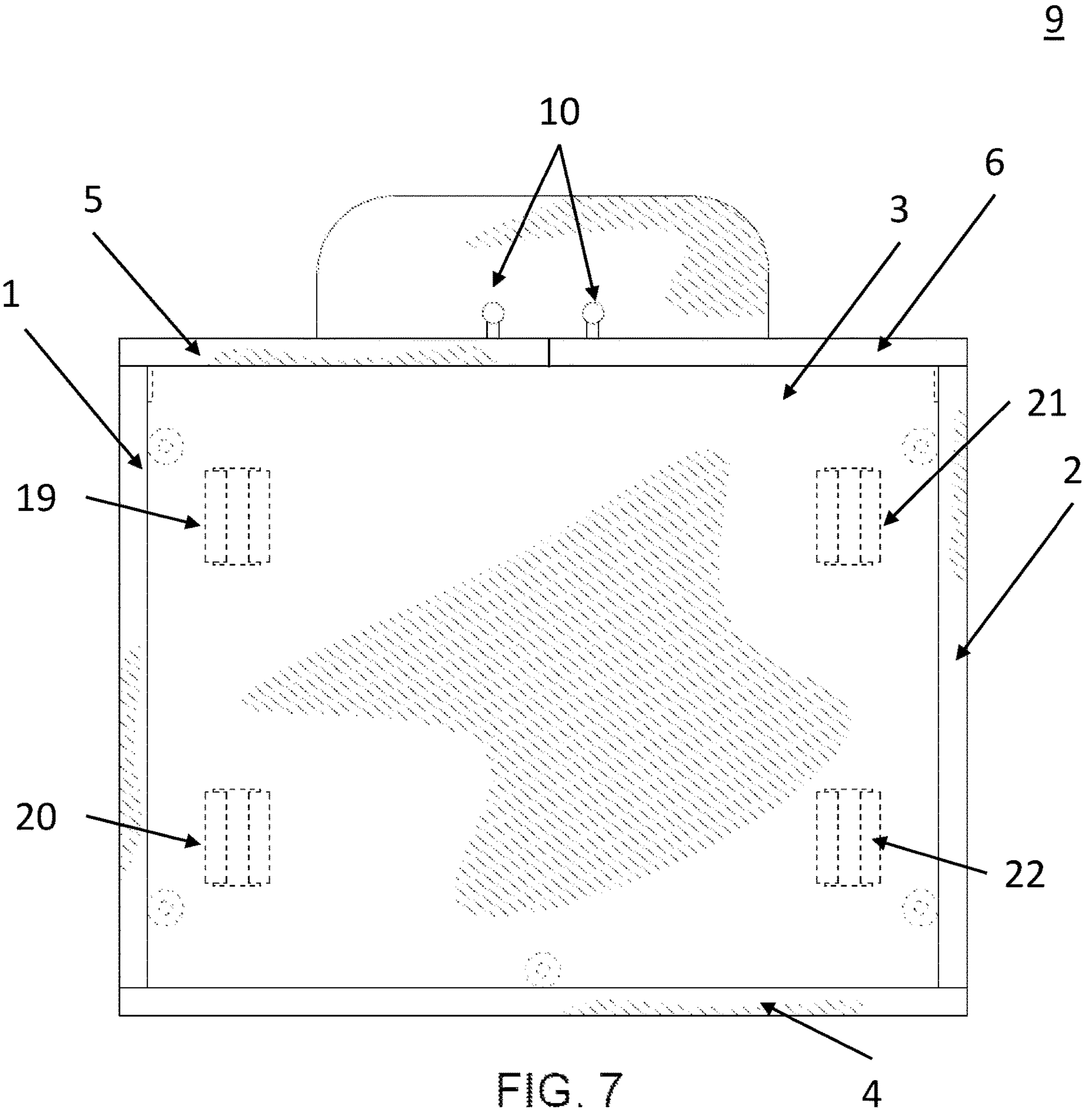
FIG. 7 is the bottom view of the raised litter box storage system of the present invention.

FIG. 7 is the bottom view of the raised litter box storage system 9 of the present invention. Here the present invention is defined by its side wall 1 and 2, back wall 4, solid bottom 3, and front doors 5 and 6. Optionally, the solid bottom floor 3 main be further comprised of a plurality of wheels 19, 20, 21, 22 making the raised litter box storage system 9 mobile and more easily relocated or moved in a location.

Figure 8:
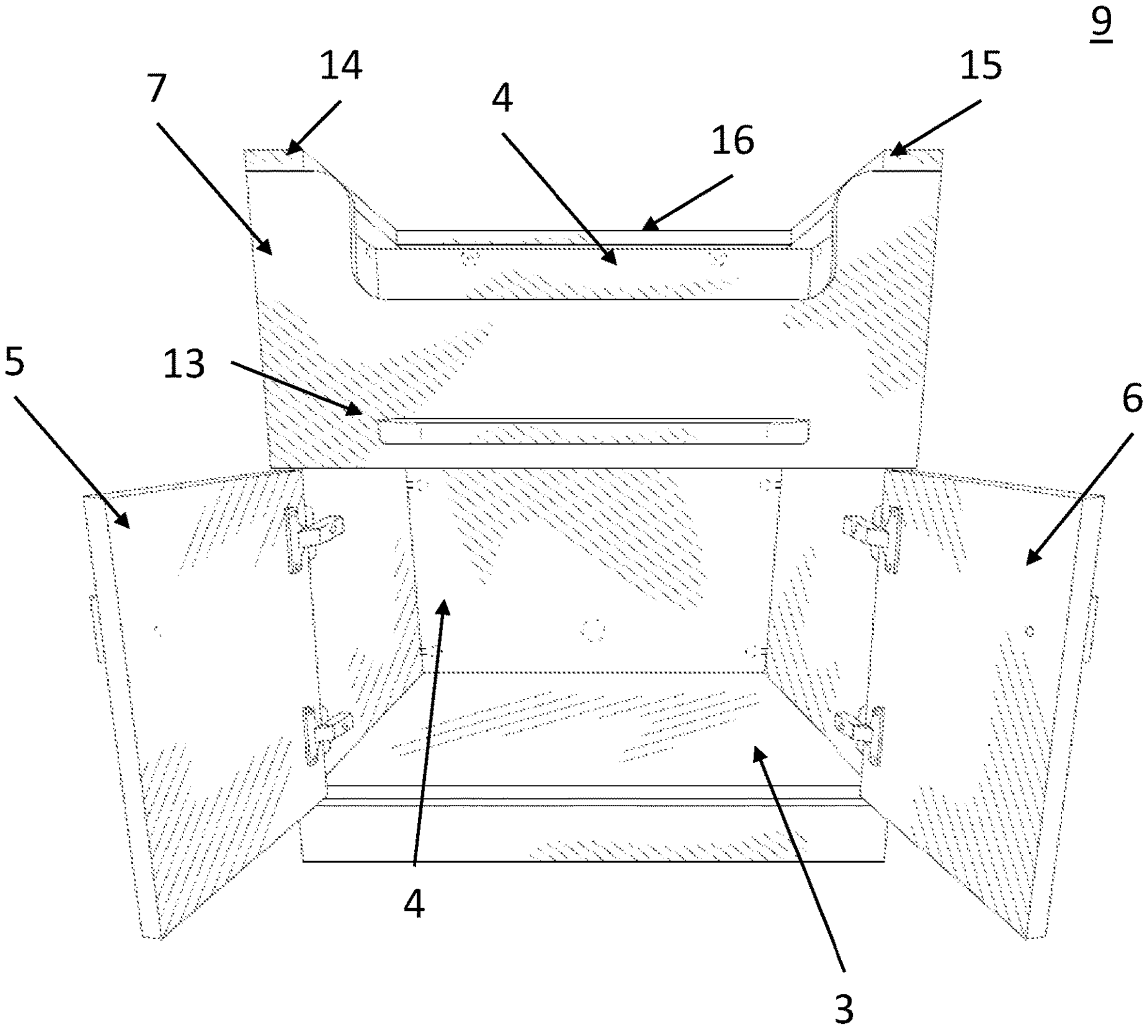
FIG. 8 is the front view of the raised litter box storage system of the present invention in a fully open position.
Figure 9:
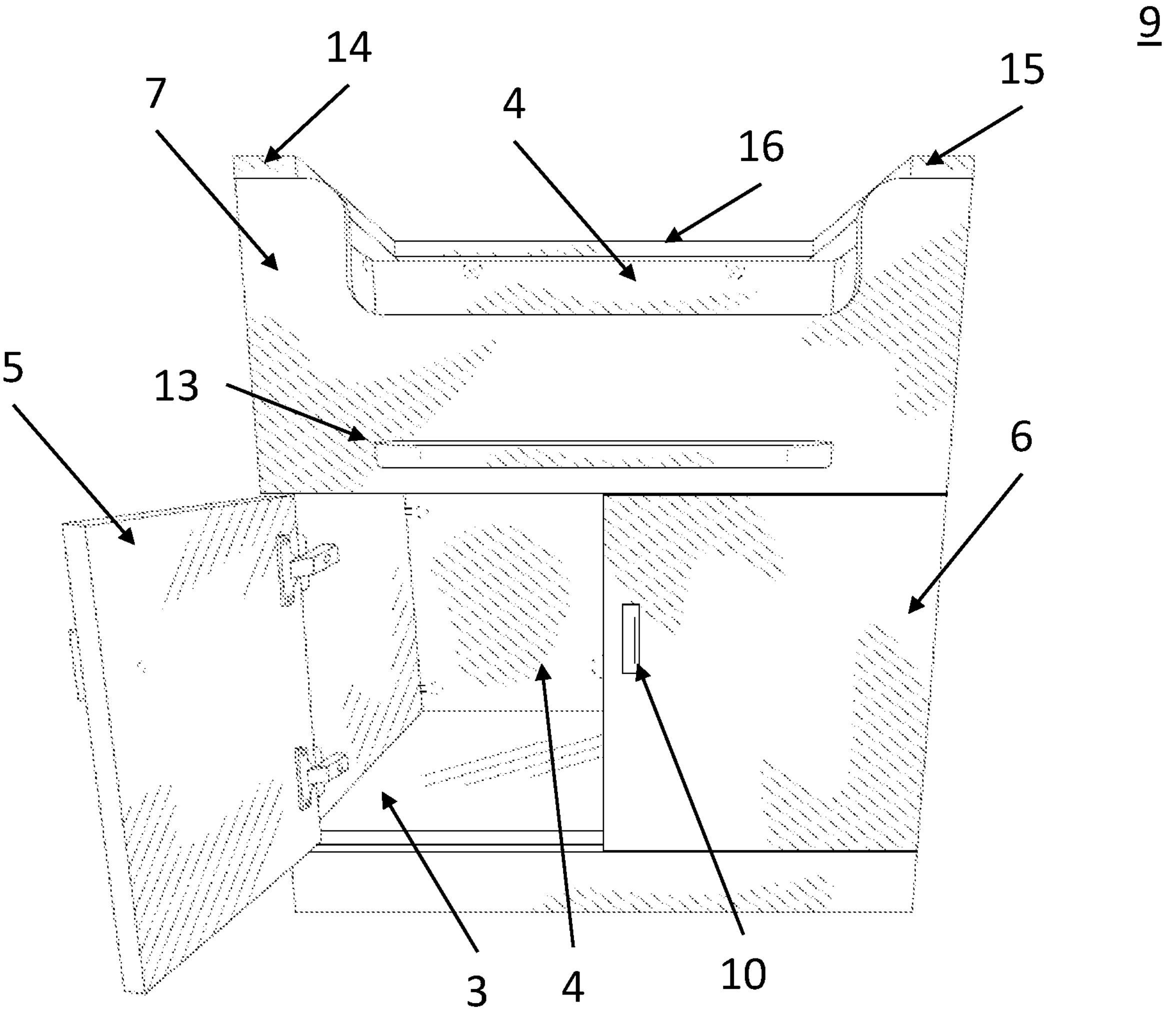
FIG. 9 is the front view of the raised litter box storage system of the present invention in a partially open position.
Figure 10:
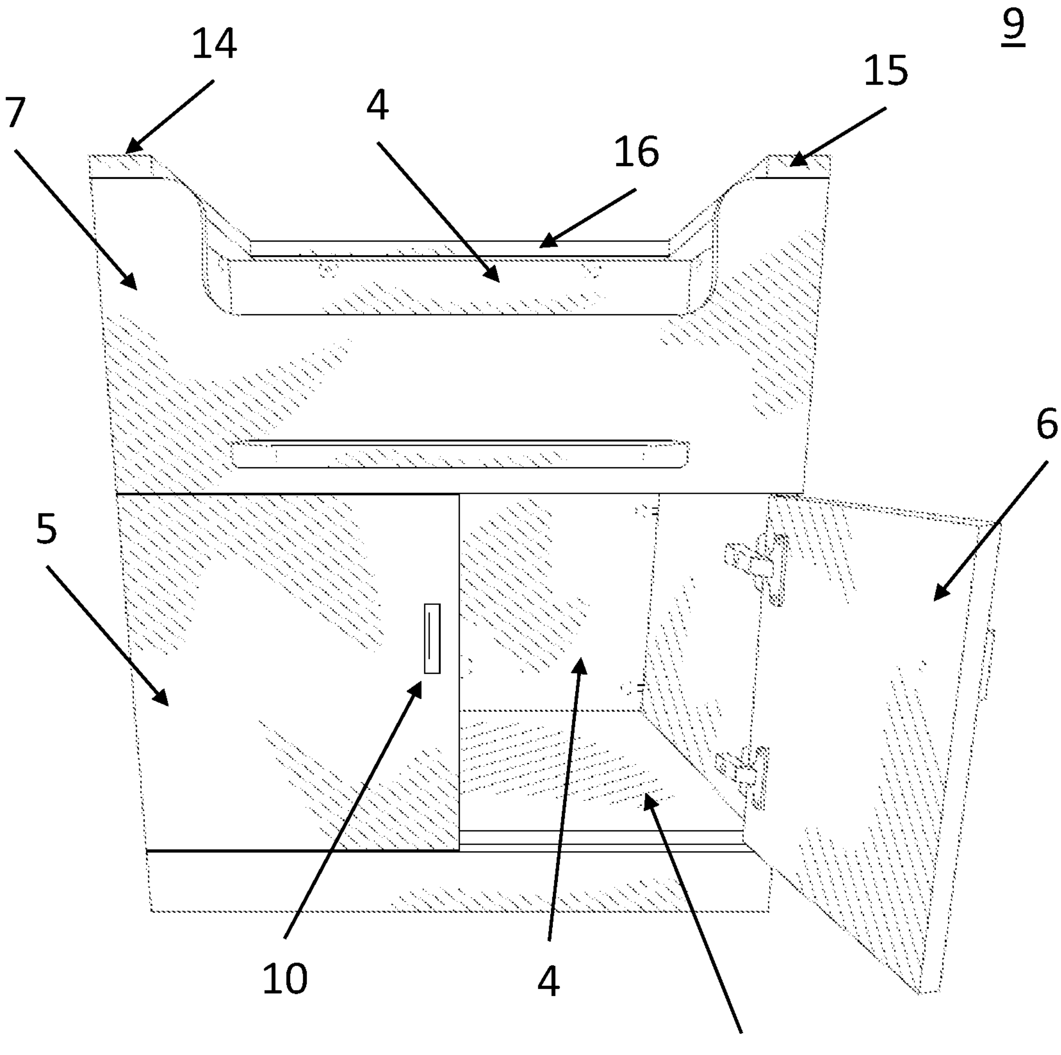
FIG. 10 is the front view of the raised litter box storage system of the present invention in a partially open position.

FIG. 8 is the front view of the raised litter box storage system 9 of the present invention in a fully open position. FIG. 9 is the front view of the raised litter box storage system 9 of the present invention in a partially open position. FIG. 10 is the front view of the raised litter box storage system 9 of the present invention in a partially open position.

Now referring to FIGS. 8-10, the raised, recessed cat litter storage system 9 is created from two solid side walls 1 and 2, a solid bottom 3, a rear/back wall 4 with small cut out for cords, two front double doors 5 and 6 swinging open from the center with each respective door being hinged to the nearest adjacent side wall, and optionally having door handles 10. An open area 11 is created by the walls and a single internal shelf located approximately halfway up the back and side walls creating a recessed litter box area floor 17 for the placement of a litter box 12. A perch 13 is located on a front wall 7 providing access to the recessed litter box area 11 and litter box 12. First and second top side rails 14 and 15 and a rear top wall rail 16 provide trim features for the raised, recessed cat litter storage system 9. The shelf is manufactured in a fixed location corresponding to the slot in an orientation allowing the T-shaped perch to be located in the slot and under but against and adjacent to the bottom of the recessed litter box area floor 17.

Figure 11:
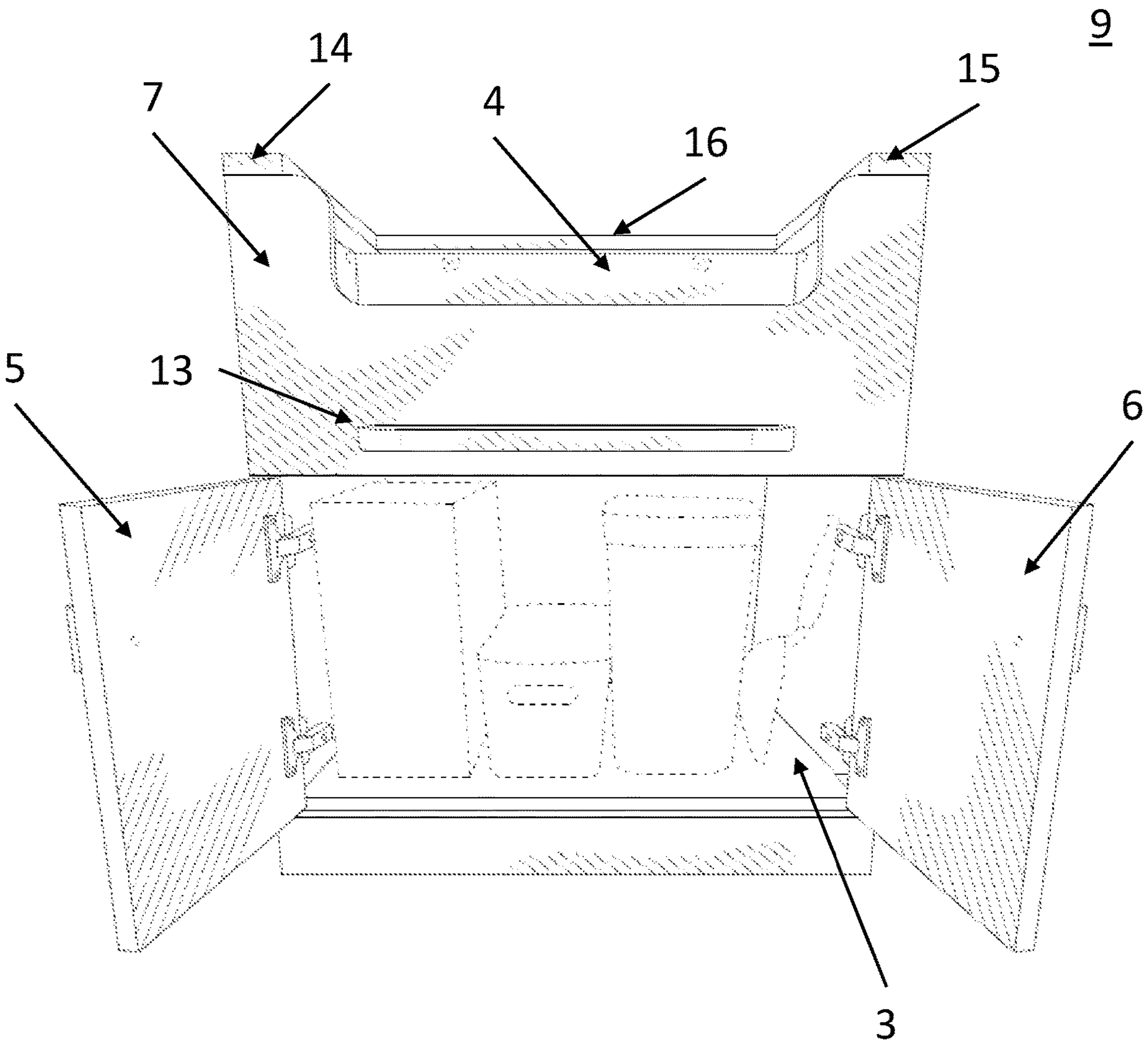
FIG. 11 is the front view of the raised litter box storage system of the present invention in a fully open position.

FIG. 11 is the front view of the raised litter box storage system 9 of the present invention in a fully open position. In this view, the use of the storage section is illustrated in an exemplary manner. Here, a plurality of common pet and litter box tools are illustrated as being located and stored in the storage area of the raised litter box storage system 9.

Figure 12:
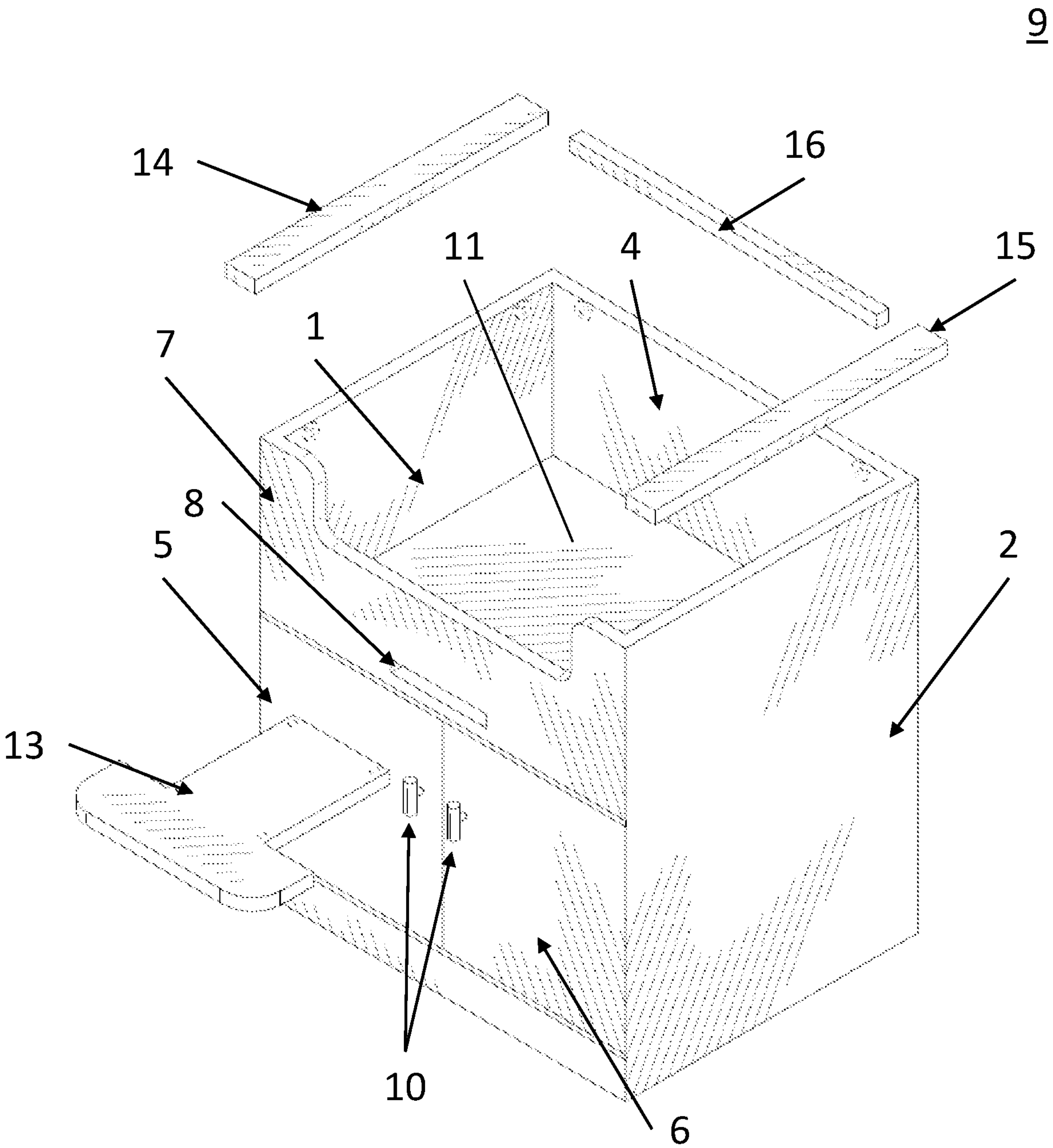
FIG. 12 is an expanded/exploded view of the present invention which illustrates the slide in perch taught by the present invention.

FIG. 12 is an expanded/exploded view of the present invention which illustrates the slide in perch taught by the present invention. The raised, recessed cat litter storage system 9 is created from two solid side walls 1 and 2, a solid bottom 3, a rear/back wall 4 with small cut out for cords, two front double doors 5 and 6 swinging open from the center with each respective door being hinged to the nearest adjacent side wall, and optionally having door handles 10. An open area 11 is created by the walls and a single internal shelf located approximately halfway up the back and side walls creating a recessed litter box area floor 17 for the placement of a litter box 12. A perch 13 is located on a front wall 7 providing access to the recessed litter box area 11 and litter box 12. First and second top side rails 14 and 15 and a rear top wall rail 16 provide trim features for the raised, recessed cat litter storage system 9. The shelf is manufactured in a fixed location corresponding to the slot in an orientation allowing the T-shaped perch to be located in the slot and under but against and adjacent to the bottom of the recessed litter box area floor 17.

Figure 13:
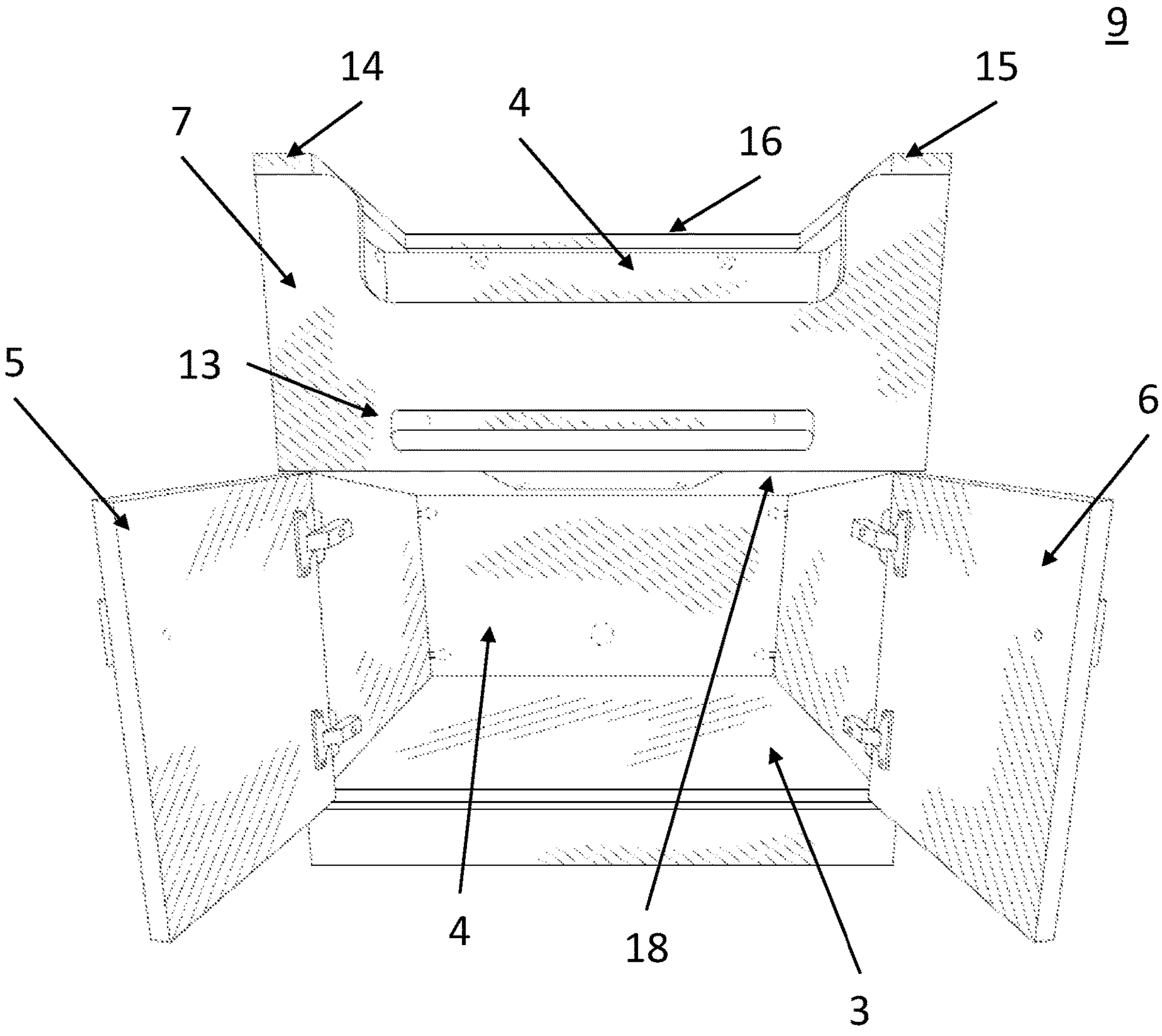
FIG. 13 is a perspective view of the present invention which illustrates the slide in perch taught by the present invention where the perch is installed into position below the recessed litter box area floor through the slot and is secured to and retained by connection to the bottom of the recessed litter box area floor.

FIG. 13 is a perspective view of the present invention which illustrates the slide in perch taught by the present invention where the perch is installed into position below the recessed litter box area floor through the slot and is secured to and retained by connection to the bottom of the recessed litter box area floor. In FIGS. 12-13, the shape of the perch is detailed as well as the means for attaching and securing the perch to the storage system taught by the present invention.

The perch has a T-shape which, with two defined sections. The cross bar or top of the T-shape protrudes from the front or outer face of the front wall 7 and creates a perch for an animal or use. The arm or bottom of the T-shape extends in to and through the front wall 7 via the slot 8. The arm or bottom of the T-shape extends through the slot and below the litter box floor 17 as shown in FIG. 12. The arm or bottom of the T-shape is then secure to the litter box floor 17 as shown in FIG. 13 by one or more screws or attachment means.

In an alternative embodiment, a molded, sprayed permanent, and/or replaceable cat-friendly material can be lasered cut, fabricated, and glued or sprayed to adhere to the inside and outer edges of the box/perch.

In yet another alternative embodiment, cat friendly material can be used inside the box so that it can be used to replace the cat litter box.

In addition to the acrylic-like protection, the box can also store a common cat litter box to be placed into the “pocket” or recessed area of the box.

As illustrated, the present invention is designed to be compatible with standard cat litter boxes currently available with respect to size and shape. In the drawings various versions of cat litter boxes have been used to illustrate this compatibility.

The present invention is specifically measured and designed to allow all users to be able to store and use any type of litter box, standard small trash bin, store new litter, as well as utilities needed to keep a tidy litter area for small living spaces.

The present invention teaches a raised, elevated off the ground open litter box allowing owners an easy way to keep it clean and concealed without much physical movement, such as bending over or kneeling.

Thus, the device is appreciated that the optimum dimensional relationships for the parts of the invention, to include variation in size, materials, shape, form, function, and manner of operation, assembly, and use, are deemed readily apparent and obvious to one of ordinary skill in the art, and all equivalent relationships to those illustrated in the drawings and described in the above description are intended to be encompassed by the present invention.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A raised, recessed cat litter box storage device comprising:

two side walls;

a bottom wall operatively associated with the two side walls;

a rear wall operatively associated with the two side walls;

two front double doors operable to swing open with each respective door being hinged to one of the two side walls;

an internal shelf vertically spaced from the bottom wall and operatively associated with the rear wall and the two side walls, wherein the internal shelf, the two side walls, and the rear wall define a recessed litter box area;

a litter box positioned on a top surface of the internal shelf, the litter box comprising litter, the litter forming a litter surface;

a front wall operatively associated with the two side walls and located above the two front double doors;

a perch fixed to the front wall, thereby providing access to the litter box;

first and second top side rails operatively associated with the two side walls and having widths that are wider than thicknesses of the side walls so that portions of the first and second top side rails extend inwardly in a direction parallel to the internal shelf and overhang outer side margins of the top surface of the internal shelf, bottom surfaces of the portions of the first and second top side rails being vertically spaced from the top surface of the internal shelf; and a rear top wall rail operatively associated with the rear wall and having a width that is wider than a thickness of the rear wall so that a portion of the rear top wall rail extends inwardly in a direction parallel to the internal shelf and overhangs an outer rear margin of the top surface of the internal shelf, a bottom surface of the portion of the rear top wall rail being vertically spaced from the top surface of the internal shelf, wherein the first and second top side rails and the rear top wall rail collectively present a continuous top planar surface that extends along a plane that is elevated above the litter box and the litter surface to define an unobstructed top opening above the top surface of the internal shelf and the litter surface.

2. The raised, recessed cat litter box storage device of claim 1, wherein the rear wall has one or more cut outs for cords.

3. The raised, recessed cat litter box storage device of claim 1, wherein each door of the two front double doors has a door handle.

4. The raised, recessed cat litter box storage device of claim 1, wherein the front wall includes a slot, and at least a portion of the perch extends into the slot so that the portion of the perch is against and adjacent to a bottom surface of the internal shelf.

5. The raised, recessed cat litter box storage device of claim 4, wherein the perch has a T-shape with two sections.

6. The raised, recessed cat litter box storage device of claim 4, wherein the perch is secured to and retained by a connection to the bottom surface of the internal shelf.

7. The raised, recessed cat litter box storage device of claim 1, wherein the internal shelf creates a recessed flat surface for the placement of the litter box, thereby enabling 360 degrees of open access to the litter surface when the litter box is filled with litter.

8. The raised, recessed cat litter box storage device of claim 1, wherein when the doors are open, access is provided to a lower storage area, which is blocked when the doors are in a closed position, creating an area for storage.

9. The raised, recessed cat litter box storage device of claim 1, further comprising wheels operatively associated with the bottom wall for allowing easy movement for cleaning or re-positioning.

10. The raised, recessed cat litter box storage device of claim 1, wherein the internal shelf is vertically spaced from the bottom wall so that the internal shelf is operable to support the litter box at a distance of at least 60.96 centimeters (two (2) feet) from the floor.

11. The raised, recessed cat litter box storage device of claim 1, wherein the litter surface is a 360-degree open access surface elevated above the internal shelf.

12. The raised, recessed cat litter box storage device of claim 1, wherein the front wall defines a front surface that is flat except for the perch.

13. The raised, recessed cat litter box storage device of claim 1, wherein the two front double doors define front surfaces that are flat, further comprising a pair of door handles connected to the front surfaces of the two front double doors.

14. The raised, recessed cat litter box storage device of claim 5, wherein the two sections of the perch are:

a first section extending along a front surface of the front wall; and a second section extending transverse to the first section, wherein the second section includes the portion of the perch extending into the slot.

15. The raised, recessed cat litter box storage device of claim 1, wherein the front wall defines a recess formed in a top edge thereof and located above the perch.

16. The raised, recessed cat litter box storage device of claim 15, wherein corners of the recess are rounded.

17. The raised, recessed cat litter box storage device of claim 1, wherein:

the first and second top side rails and the rear top wall rail are distinct pieces, the first and second top side rails abut the rear top wall rail, and the continuous top surfaces of the first and second top side rails and the continuous top surface of the rear top wall rail are flush.

18. The raised, recessed cat litter box storage device of claim 1, wherein the internal shelf has a bottom surface that is flat and defines a top boundary of a lower storage area.

19. The raised, recessed cat litter box storage device of claim 1, wherein the width of the rear top wall rail is narrower than the widths of the first and second top side rails.

* * * * *